United States Patent
Han et al.

(10) Patent No.: US 12,158,791 B2
(45) Date of Patent: Dec. 3, 2024

(54) PORTABLE DEVICE FOR UNLOCKING VEHICLE, METHOD, AND STORAGE MEDIUM

(71) Applicant: NIO TECHNOLOGY (ANHUI) CO., LTD, Hefei (CN)

(72) Inventors: Yiqi Han, Shanghai (CN); Bohong Xiao, Shanghai (CN); Zheng Liu, Shanghai (CN); Yunwei He, Shanghai (CN); Qizhuang Shen, Shanghai (CN); Tongzhou Zhou, Shanghai (CN); Zihan Wang, Shanghai (CN); Cheng Wang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 87 days.

(21) Appl. No.: 18/178,584

(22) Filed: Mar. 6, 2023

(65) Prior Publication Data
US 2023/0280815 A1 Sep. 7, 2023

(30) Foreign Application Priority Data
Mar. 7, 2022 (CN) .......................... 202210216001.4

(51) Int. Cl.
*G06F 1/32* (2019.01)
*B60R 25/01* (2013.01)
(Continued)

(52) U.S. Cl.
CPC ............ *G06F 1/3234* (2013.01); *B60R 25/01* (2013.01); *B60R 25/245* (2013.01);
(Continued)

(58) Field of Classification Search
None
See application file for complete search history.

(56) References Cited

U.S. PATENT DOCUMENTS

2007/0162191 A1* 7/2007 Matsubara ......... G07C 9/00309
701/1
2007/0268110 A1 11/2007 Little
(Continued)

FOREIGN PATENT DOCUMENTS

| CN | 102047196 | 5/2011 |
|----|-----------|--------|
| CN | 102055166 | 5/2011 |

(Continued)

OTHER PUBLICATIONS

Official Action with Machine Translation for China Patent Application No. 202210216001.4, dated Aug. 25, 2023, 21 pages.
(Continued)

*Primary Examiner* — Nitin C Patel
(74) *Attorney, Agent, or Firm* — Sheridan Ross P.C.

(57) ABSTRACT

The disclosure relates to a portable device for unlocking a vehicle, a method, and a storage medium. The portable device includes a communication unit and a processing unit. The communication unit is configured to scan a pairing request signal from the vehicle, and transmit a locking/unlocking signal to the vehicle. The processing unit is configured to: receive a motion status signal indicating a motion status of the portable device and a temperature signal indicating an ambient temperature of the portable device; and switch an operating mode of the portable device based on at least one of the motion status signal and the temperature signal. The portable device for unlocking a vehicle proposed in the disclosure can switch its operating mode in response to a change in the motion status and the ambient temperature, thereby solving a problem of fast power consumption and a short service life of a smart key, and solving a problem of failure of a function of the smart key at high temperature in summer or at low temperature in winter.

14 Claims, 1 Drawing Sheet

(51) Int. Cl.
*B60R 25/24* (2013.01)
*G06F 1/3231* (2019.01)
*G06F 1/3234* (2019.01)
*G07C 9/00* (2020.01)

(52) U.S. Cl.
CPC ....... *G06F 1/3231* (2013.01); *G07C 9/00309* (2013.01); *B60R 2325/101* (2013.01); *B60R 2325/20* (2013.01); *G07C 2009/00769* (2013.01); *G07C 2209/63* (2013.01)

(56) References Cited

U.S. PATENT DOCUMENTS

| | | | |
|---|---|---|---|
| 2017/0217404 A1* | 8/2017 | Lee | B60R 25/245 |
| 2018/0245559 A1* | 8/2018 | Kang | G07C 9/00174 |
| 2019/0090119 A1 | 3/2019 | Ballam et al. | |

FOREIGN PATENT DOCUMENTS

| | | |
|---|---|---|
| CN | 106899361 | 6/2017 |
| CN | 107222916 | 9/2017 |
| CN | 110837456 | 2/2020 |
| DE | 102013218022 | 3/2015 |
| DE | 102017129058 | 6/2019 |
| JP | H08-99599 | 4/1996 |
| JP | 2008-227789 | 9/2008 |

OTHER PUBLICATIONS

Extended Search Report for European Patent Application No. 23160163.4, dated Jul. 14, 2023, 7 pages.

* cited by examiner

10

20

30

PORTABLE DEVICE FOR UNLOCKING VEHICLE, METHOD, AND STORAGE MEDIUM

CROSS-REFERENCE TO RELATED APPLICATIONS

This application claims the benefit of China Patent Application No. 202210216001.4 filed Mar. 7, 2022, the entire contents of which are incorporated herein by reference in its entirety.

TECHNICAL FIELD

The disclosure relates to the field of vehicles, and more specifically, to a portable device for unlocking a vehicle, a control method for a portable device, and a storage medium.

BACKGROUND

A passive keyless entry system of a vehicle, that is, a passive entry passive start system of the vehicle, is a vehicle identification code identification system based on a radio frequency technology. With advancement of technology and expansion of automobile markets, an increasing quantity of models are equipped with the system. In a passive keyless entry system of a vehicle, when a smart key enters a range of the system, through direct communication between the smart key and the vehicle, a user may unlock the vehicle without inserting a key into a mechanical lock, and may switch on the ignition after entering the vehicle. The smart key system is convenient and practical, and is currently quite popular.

However, a conventional vehicle key and a smart key currently on the market cannot perceive a motion status and an action posture of a vehicle owner, and consequently, often unnecessarily consume power in a carrying process. A key with a low battery may bring a great trouble to use a vehicle in an environment where the vehicle owner leaves the vehicle. Therefore, how to reduce power consumption in conjunction with a real intention of the vehicle owner when the key is idle will be an important issue.

In addition, in different environments, a performance parameter of the smart key is greatly affected. For example, a vehicle key often fail in severe winter weather in the north. Because a signal transmitted by the vehicle key cannot be adaptively adjusted according to environmental changes, it is easy to cause failure of unlocking or locking in a scenario of using the vehicle.

BRIEF SUMMARY

According to an aspect of the disclosure, a portable device for unlocking a vehicle is provided, including: a communication unit configured to scan a pairing request signal from the vehicle, and transmit a locking/unlocking signal to the vehicle; and a processing unit configured to: receive a motion status signal indicating a motion status of the portable device and a temperature signal indicating an ambient temperature of the portable device; and switch an operating mode of the portable device based on at least one of the motion status signal and the temperature signal.

As an alternative or addition to the above solution, in the device according to an embodiment of the disclosure, at least one of the following parameters of the portable device changes when the operating mode is switched: a scanning frequency, a transmit power, a transmit frequency, and an on-off status of each sensor.

As an alternative or addition to the above solution, in the device according to an embodiment of the disclosure, the portable device further includes at least one of the following: a motion sensor configured to detect the motion status of the portable device; and a temperature sensor configured to detect the ambient temperature of the portable device.

As an alternative or addition to the above solution, in the device according to an embodiment of the disclosure, the processing unit is further configured to switch the portable device to a protective operating mode when the ambient temperature is higher than a first temperature threshold or lower than a second temperature threshold.

As an alternative or addition to the above solution, in the device according to an embodiment of the disclosure, the processing unit is further configured to perform at least one of the following operations when the ambient temperature is higher than the first temperature threshold: reducing the scanning frequency of the portable device to a first frequency threshold; and reducing the transmit power of the portable device to a first power threshold.

As an alternative or addition to the above solution, in the device according to an embodiment of the disclosure, the processing unit is further configured to perform at least one of the following operations when the ambient temperature is lower than the second temperature threshold: reducing the scanning frequency of the portable device to a first frequency threshold; reducing the transmit power of the portable device to a first power threshold; and increasing the transmit frequency of the portable device to a second frequency threshold.

As an alternative or addition to the above solution, in the device according to an embodiment of the disclosure, the processing unit is further configured to: when the ambient temperature is lower than a third temperature threshold, generate a first command for generating alarm prompt information, where the third temperature threshold is lower than or equal to the second temperature threshold.

As an alternative or addition to the above solution, in the device according to an embodiment of the disclosure, the processing unit is further configured to switch the portable device to a deep sleep mode when the motion status signal indicates that the portable device has been in a stationary state for a first time threshold.

As an alternative or addition to the above solution, in the device according to an embodiment of the disclosure, in the deep sleep mode, the processing unit is further configured to: reduce the scanning frequency of the portable device to a third frequency threshold; and generate a second command for disabling an ambient temperature detection function.

According to another aspect of the disclosure, a control method for a portable device is provided, the portable device being configured to unlock a vehicle, and the method including the following steps: A. receiving a motion status signal indicating a motion status of the portable device and a temperature signal indicating an ambient temperature of the portable device; and B. switching an operating mode of the portable device based on at least one of the motion status signal and the temperature signal.

As an alternative or addition to the above solution, in the method according to an embodiment of the disclosure, at least one of the following parameters of the portable device changes when the operating mode is switched: a scanning frequency, a transmit power, a transmit frequency, and an on-off status of each sensor.

As an alternative or addition to the above solution, in the method according to an embodiment of the disclosure, step B includes: B1. switching the portable device to a protective operating mode when the ambient temperature is higher than a first temperature threshold or lower than a second temperature threshold.

As an alternative or addition to the above solution, in the method according to an embodiment of the disclosure, in step B1, at least one of the following operations is performed when the ambient temperature is higher than the first temperature threshold: reducing the scanning frequency of the portable device to a first frequency threshold; and reducing the transmit power of the portable device to a first power threshold.

As an alternative or addition to the above solution, in the method according to an embodiment of the disclosure, in step B1, at least one of the following operations is performed when the ambient temperature is lower than the second temperature threshold: reducing the scanning frequency of the portable device to a first frequency threshold; reducing the transmit power of the portable device to a first power threshold; and increasing the transmit frequency of the portable device to a second frequency threshold.

As an alternative or addition to the above solution, in the method according to an embodiment of the disclosure, step B1 further includes: when the ambient temperature is lower than a third temperature threshold, generating a first command for generating alarm prompt information, where the third temperature threshold is lower than or equal to the second temperature threshold.

As an alternative or addition to the above solution, in the method according to an embodiment of the disclosure, step B further includes: B2. switching the portable device to a deep sleep mode when the motion status signal indicates that the portable device has been in a stationary state for a first time threshold.

As an alternative or addition to the above solution, in the method according to an embodiment of the disclosure, in step B2, in the deep sleep mode: the scanning frequency of the portable device is reduced to a third frequency threshold; and a second command is generated for disabling an ambient temperature detection function.

According to still another aspect of the disclosure, a computer-readable storage medium is provided, having a computer program stored thereon, where the program implements, when executed by a processor, any item of the method described above.

The portable device for unlocking a vehicle proposed in the disclosure can switch its operating mode in response to a change in the motion status, thereby solving a problem of fast power consumption and a short service life of a smart key. For example, the portable device according to some embodiments of the disclosure can switch its operating mode to the deep sleep mode when detecting that the portable device is in an idle state, reduce the scanning frequency of the device (for example, a frequency at which a positioning request is sent and broadcast), and disable functions of some sensors, thereby greatly reducing static power consumption of the device and avoiding a problem of unnecessary power consumption in a carrying process.

In addition, the portable device according to some embodiments of the disclosure can switch its operating mode in response to a change in the ambient temperature, thereby solving a problem of battery damage of a smart vehicle key at high temperature in summer or failure of a locking/unlocking function of the smart vehicle key at low temperature in winter. For example, the portable device can adaptively adjust its transmit frequency, scanning frequency, transmit power, and the like when the ambient temperature is too high (for example, higher than 50° C.) or too low (for example, lower than 0° C.), to ensure normal operation of a battery, a locking/unlocking function, and the like.

BRIEF DESCRIPTION OF THE SEVERAL VIEWS OF THE DRAWINGS

The above-mentioned and/or other aspects and advantages of the disclosure will become more apparent and more readily appreciated from the following description of various aspects in conjunction with the accompanying drawings, in which the same or similar units are denoted by the same reference numerals. In the drawings.

DETAILED DESCRIPTION

Figure 1:
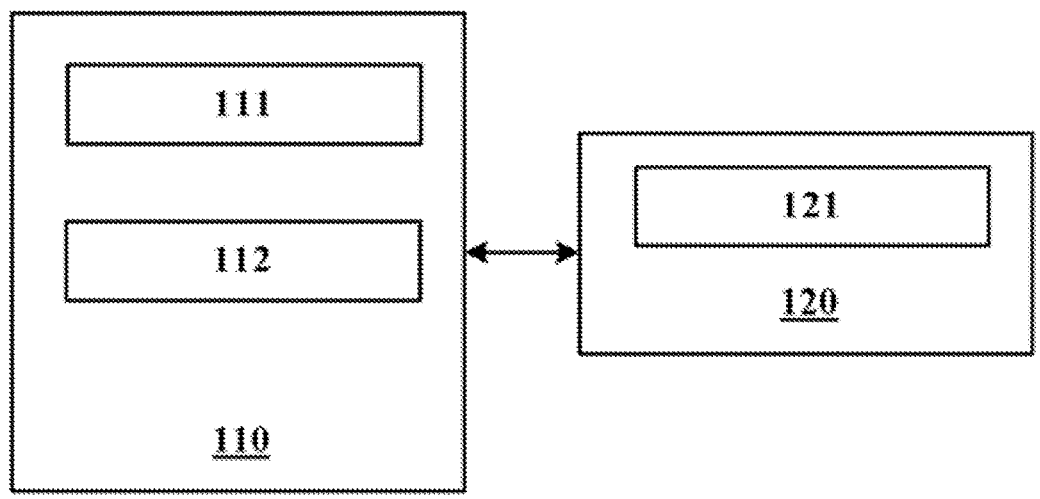
FIG. 1 is a schematic block diagram of a vehicle unlocking system 10 according to an embodiment of the disclosure.

In this specification, the disclosure is described more fully with reference to the accompanying drawings in which schematic embodiments of the disclosure are illustrated. However, the disclosure may be implemented in different forms, and should not be construed as being limited to the embodiments provided herein. The embodiments provided herein are intended to make the disclosure of this specification full and complete, to convey the scope of protection of the disclosure more fully to those skilled in the art.

It should be noted that the terms such as "first" and "second" herein are intended to distinguish between similar objects, and do not necessarily describe a sequence of objects in terms of time, space, size, and the like. In addition, unless otherwise specified, the terms "including/comprising", "having", and similar expressions herein are intended to mean a non-exclusive inclusion.

In this specification, the term "vehicle" or another similar term herein includes a general motor vehicle, such as a passenger vehicle (including a sport utility vehicle, a bus, a truck, and the like), and various commercial vehicles, and includes a hybrid vehicle, an electric vehicle, a plug-in hybrid electric vehicle, and the like. A hybrid vehicle is a vehicle with two or more power sources, such as a vehicle powered by a gasoline engine and an electric motor.

In this specification, the term "portable device" refers to any mobile electronic device that can be used to unlock a vehicle, which may include but is not limited to: a wearable electronic device such as a smart watch, a smart band, a smart necklace, and a smart key, and a mobile terminal such as a smart phone.

A smart key currently on the market continuously uses a default scanning frequency to scan a signal connection point (such as a Bluetooth connection point) of a vehicle, and the default scanning frequency may be a default scanning frequency on a side of the smart key. Specifically, the default scanning frequency may be a fixed scanning frequency. Continuously scanning at a high default frequency may result in high power consumption for the smart key, while continuously scanning at a low default frequency may result in too slow vehicle door unlocking.

In addition, the smart key currently on the market uses a default transmit frequency to transmit a locking/unlocking signal (for example, including an unlocking data packet, a locking data packet, and a sensor data packet) to the vehicle, and the default transmit frequency may be a default transmit frequency on the side of the smart key. Specifically, the default transmit frequency may be a fixed transmit frequency. However, because a battery performance of the smart key may be limited at extreme ambient temperature, a function of the key occasionally fails. If the fixed transmit frequency is still used to transmit a locking/unlocking signal in this case, it will easily lead to unlocking or locking failure.

As innovatively proposed in the disclosure, an operating mode of a smart portable device is switched in response to changes in a motion status and/or an ambient temperature, and a scanning frequency, a transmit power, a transmit frequency, and an on-off status of each sensor are adaptively adjusted, so that while it is ensured that an unlocking function or a locking function of the device can operate normally, and a problem of unnecessary power consumption in a carrying process is avoided in conjunction with a real intention of a vehicle owner, thereby reducing the power consumption of the key, and improving the user experience.

Various exemplary embodiments according to the disclosure will be described below in detail with reference to the accompanying drawings.

FIG. 1 is a schematic block diagram of a vehicle unlocking system 10 according to an embodiment of the disclosure.

As shown in FIG. 1, the vehicle unlocking system 10 includes a vehicle 110 and a portable device 120. Exemplarily, the portable device 120 may be a wearable electronic device such as a smart watch, a smart band, a smart necklace, and a smart key, or may be a mobile terminal such as a smart phone.

The vehicle 110 may be provided with a vehicle-mounted controller 111 and a vehicle-mounted communication unit 112. The vehicle-mounted communication unit 112 may be a communication unit with a wireless communication function such as in-vehicle Bluetooth or a vehicle-mounted radio frequency unit. The vehicle-mounted controller 111 may control the vehicle-mounted communication unit 112 to send a pairing request signal to the portable device 120 of a user and establish a wireless connection to the portable device 120 of the user. The vehicle-mounted controller 111 may control unlocking or locking of a vehicle door based on a locking/unlocking signal sent by the portable device 120.

The portable device 120 may be provided with a communication unit 121 (for example, Bluetooth and a radio frequency unit), and the portable device 120 may establish a connection to the vehicle 110 through the communication unit 121. Exemplarily, when the vehicle 110 is within a scanning range of the portable device 120, the portable device 120 can control the vehicle 110. A structure and functions of the portable device will be described in detail below with reference to FIG. 2.

Figure 2:
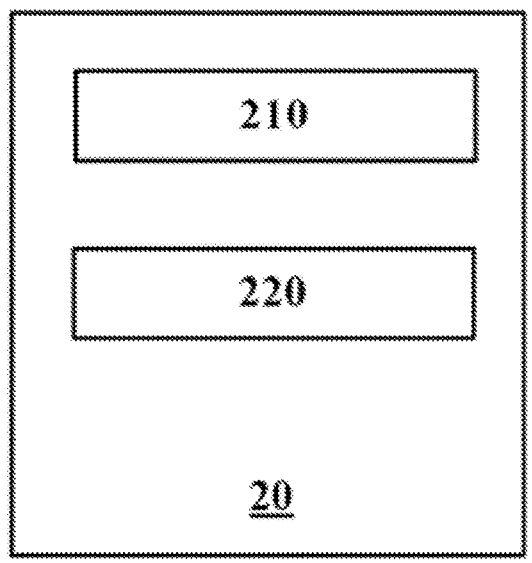
FIG. 2 is a schematic block diagram of a portable device 20 for unlocking a vehicle according to an embodiment of the disclosure.

With continued reference to FIG. 2, FIG. 2 is a schematic block diagram of the portable device 20 for unlocking a vehicle according to an embodiment of the disclosure.

As shown in FIG. 2, the portable device 20 includes a communication unit 210 and a processing unit 220. Exemplarily, the portable device 20 may be the portable device 120 shown in FIG. 1, or may be any wearable electronic device or mobile terminal.

The communication unit 210 in the portable device 20 may be configured to scan a pairing request signal from the vehicle, and transmit a locking/unlocking signal to the vehicle. Exemplarily, the communication unit 110 may be integrated with a Bluetooth module or a radio frequency module. Exemplarily, when a Bluetooth function of the communication unit 210 integrated with the Bluetooth module is enabled, the portable device 20 performs a scan for Bluetooth devices within a specific distance range.

Optionally, when having scanned a pairing request signal having a specific identifier, the communication unit 210 can send a pairing response signal to the vehicle-mounted communication unit 112 of the vehicle having the specific identifier, and establish a connection relationship with the vehicle-mounted communication unit 112.

Optionally, after the connection relationship is successfully established, the communication unit 210 may transmit a locking/unlocking signal to the paired vehicle-mounted communication unit 112. The locking/unlocking signal may include, for example, an unlocking data packet, a locking data packet, and a sensor data packet.

The processing unit 220 in the portable device 20 may be configured to receive a motion status signal indicating a motion status of the portable device 20 and a temperature signal indicating an ambient temperature of the portable device 20. Exemplarily, the processing unit 220 may be any suitable dedicated or general-purpose processor such as a field-programmable gate array (FPGA), an application-specific integrated circuit (ASIC), or a digital signal processor (DSP).

In an example, the portable device 20 may be communicatively coupled to another communication device (for example, a smart phone having a motion status monitoring function, an ambient temperature monitoring function, and a GPS positioning function) or a cloud storage platform in a wired or wireless manner, and receive, from the communication device or the cloud storage platform, a motion status signal indicating the motion status of the portable device 20 and a temperature signal indicating of the ambient temperature of the portable device 20.

In another example, the portable device 20 may include a motion sensor 230 and a temperature sensor 240, and the processing unit 220 controls the motion sensor 230 and the temperature sensor 240 to be enabled or disabled.

Optionally, the portable device 20 may include a high-precision ultra-wideband (UWB) sensor 250. The portable device 20 equipped with the UWB sensor 250 can implement anti-lost and tracking and positioning technologies similar to Air Tag. When losing the portable device 20, the user may initiate a positioning request through a UWB chip on another electronic device (for example, a smart phone) to find the portable device 20, and the positioning precision of the chip can reach 10 cm. In addition, a gain of a UWB in passive entry passive start is very obvious. By cooperating with a vehicle-side UWB node, the positioning precision of the chip is at least 60% higher than that of conventional passive entry.

The processing unit 220 may be further configured to switch an operating mode of the portable device 20 based on at least one of the motion status signal and the temperature signal. Exemplarily, the operating mode may include one or more of the following: a standard operating mode, precise operating mode, a protective operating mode, a low-power operating mode, and a deep sleep operating mode.

Optionally, at least one of the following parameters of the portable device 20 changes when the operating mode is switched: a scanning frequency, a transmit power, a transmit frequency, and an on-off status of each sensor.

As mentioned above, the scanning frequency is a frequency at which the portable device 20 scans a signal connection point of the vehicle (for example, a pairing request signal sent by the signal connection point); the transmit power is a frequency at which the portable device 20 transmits a locking/unlocking signal (for example, an unlocking data packet, a locking data packet, or a sensor data packet) to the paired vehicle; and the transmit power is a power at which the portable device 20 transmits a locking/unlocking signal to the paired vehicle, and the transmit power is associated with the transmit frequency and a distance between the portable device 20 and the vehicle.

Optionally, the processing unit 220 is further configured to switch the portable device 20 to a protective operating mode when the ambient temperature is higher than a first temperature threshold or lower than a second temperature threshold. For example, when it is detected that the portable device 20 is in an extreme environment, the protective operating mode can be entered. In this mode, a communication frequency of functional modules such as Bluetooth and the UWB sensor may be adaptively adjusted based on the environment.

Specifically, the processing unit 220 may be configured to perform at least one of the following operations when the ambient temperature is higher than the first temperature threshold: reducing the scanning frequency of the portable device 20 to a first frequency threshold; and reducing the transmit power of the portable device 20 to a first power threshold. Exemplarily, the first temperature threshold may be 50° C., the first frequency threshold may be within a range of 0.3 Hz to 1 Hz, and the first power threshold may be 70% of a transmit power in the standard operating mode.

Optionally, when the ambient temperature is higher than the first temperature threshold, the processing unit 220 may increase a communication frequency of the UWB sensor 250 to be within a range of 1.5 to 2.5 times a communication frequency in the standard operating mode.

The processing unit 220 is further configured to perform at least one of the following operations when the ambient temperature is lower than the second temperature threshold: reducing the scanning frequency of the portable device to a first frequency threshold; reducing the transmit power of the portable device to a first power threshold; and increasing the transmit frequency of the portable device to a second frequency threshold. Exemplarily, the second temperature threshold may be 0° C., the first power threshold may be 70% of the transmit power in the standard operating mode, and the second frequency threshold may be 3 times the transmit frequency in the standard operating mode.

Through adaptive adjustment of the transmit frequency, the scanning frequency, the transmit power, and another parameter of the portable device 20 when the ambient temperature is too high (for example, higher than 50° C.) or too low (for example, lower than 0° C.), a problem of battery damage of the portable device 20 at high temperature in summer or failure of a locking/unlocking function of the portable device at low temperature in winter can be solved, to ensure normal operation of a battery, the locking/unlocking function, and the like.

Further, the processing unit 220 may be further configured to: when the ambient temperature is lower than a third temperature threshold, generate a first command for generating alarm prompt information, where the third temperature threshold is lower than or equal to the second temperature threshold. Exemplarily, the third temperature threshold may be −20° C.

Optionally, the processing unit 220 may be further configured to: when the ambient temperature is lower than the third temperature threshold, increase a communication frequency of the UWB sensor 250 to be within a range of 1.7 to 2.5 times a communication frequency in the standard operating mode, or disable the UWB sensor 250.

At too low temperature, the portable device 20 may fail, and rapid discharge may also occur. Therefore, in this case, in addition to adjusting a functional frequency, the processing unit 220 may generate a first command, and the communication unit 210 transmits the first command to an alarm device for generating alarm prompt information. For example, the communication unit 210 may transmit the first command to a smart phone of the user, to generate an overcooling warning prompt (for example, a text prompt, a voice prompt, or a flashing light prompt) on the mobile phone.

Optionally, the processing unit 220 may be further configured to switch the portable device 20 to a deep sleep mode when the motion status signal indicates that the portable device 20 has been in a stationary state for a first time threshold. Exemplarily, the deep sleep mode may be entered when the portable device 20 has been in a stationary state for 5 minutes. In this mode, the scanning frequency of the portable device 20 and an on-off status of each sensor (for example, the motion sensor 230, the temperature sensor 240, or the UWB sensor 250) will be adaptively adjusted.

Specifically, in the deep sleep mode, the processing unit may be configured to: reduce the scanning frequency of the portable device 20 to a third frequency threshold; and generate a second command for disabling an ambient temperature detection function. Exemplarily, the third frequency threshold may be 0.2 Hz. Through reducing of the scanning frequency of the portable device 20 (for example, a frequency at which a positioning request is sent and broadcast) and disabling of functions of some sensors, static power consumption of the portable device 20 can be greatly reduced, and a problem of unnecessary power consumption in a carrying process can be avoided.

Figure 3:
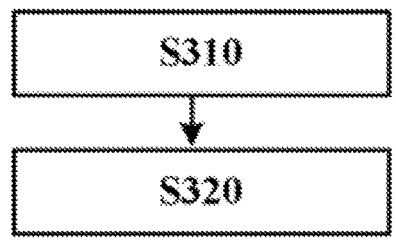
FIG. 3 is a schematic flowchart of a control method 30 for a portable device according to an embodiment of the disclosure.

With continued reference to FIG. 3, FIG. 3 is a schematic flowchart of a control method 30 for a portable device according to an embodiment of the disclosure. The portable device may be the portable device 120 shown in FIG. 1, or the portable device 20 shown in FIG. 2.

In step S310, a motion status signal indicating a motion status of the portable device and a temperature signal indicating an ambient temperature of the portable device are received.

Exemplarily, a temperature signal and a motion status signal can be received from another communication device (for example, a smart phone having a motion status monitoring function, an ambient temperature monitoring function, and a GPS positioning function) or a cloud storage platform in a wired or wireless manner, or a temperature signal and a motion status signal are detected directly through a sensor.

In step S320, an operating mode of the portable device is switched based on at least one of the motion status signal and the temperature signal. Optionally, at least one of the following parameters of the portable device changes when the operating mode is switched: a scanning frequency, a transmit power, a transmit frequency, and an on-off status of each sensor.

Optionally, step S320 may further include switching the portable device to a protective operating mode when the ambient temperature is higher than a first temperature threshold or lower than a second temperature threshold.

Optionally, at least one of the following operations is performed when the ambient temperature is higher than the first temperature threshold: reducing the scanning frequency of the portable device to a first frequency threshold; and reducing the transmit power of the portable device to a first power threshold. Exemplarily, the first temperature threshold may be 50° C., the first frequency threshold may be within a range of 0.3 Hz to 1 Hz, and the first power threshold may be 70% of a transmit power in the standard operating mode.

Optionally, at least one of the following operations is performed when the ambient temperature is lower than the second temperature threshold: reducing the scanning frequency of the portable device to a first frequency threshold; reducing the transmit power of the portable device to a first power threshold; and increasing the transmit frequency of the portable device to a second frequency threshold. Exemplarily, the second temperature threshold may be 0° C., the first power threshold may be 70% of the transmit power in the standard operating mode, and the second frequency threshold may be 3 times the transmit frequency in the standard operating mode.

Optionally, step S320 may further include: when the ambient temperature is lower than a third temperature threshold, generating a first command for generating alarm prompt information, where the third temperature threshold is lower than or equal to the second temperature threshold. Exemplarily, the third temperature threshold may be −20° C.

Optionally, step S320 may further include switching the portable device to a deep sleep mode when the motion status signal indicates that the portable device has been in a stationary state for a first time threshold.

Optionally, in the deep sleep mode, the scanning frequency of the portable device may be reduced to a third frequency threshold; and a second command is generated for disabling an ambient temperature detection function. Exemplarily, the third frequency threshold may be 0.2 Hz.

According to another aspect of the disclosure, a computer-readable storage medium having a computer program stored thereon is further provided, where the program, when executed by a processor, implements the method shown in FIG. 3. The computer-readable storage medium may include a random access memory (RAM) such as a synchronous dynamic random access memory (SDRAM), a read-only memory (ROM), a non-volatile random access memory (NVRAM), an electrically erasable programmable read-only memory (EEPROM), a flash memory, or another known storage medium.

According to some embodiments of the disclosure, the operating mode of the portable device can be switched in response to a change in its motion status, thereby solving a problem of fast power consumption and a short service life. For example, the portable device can switch its operating mode to the deep sleep mode when detecting that the portable device is in an idle state, reduce the scanning frequency of the device, and disable functions of some sensors, thereby greatly reducing static power consumption of the device and avoiding a problem of unnecessary power consumption in a carrying process.

According to some embodiments of the disclosure, the portable device can switch its operating mode in response to a change in the ambient temperature, thereby solving a problem of battery damage of a smart vehicle key at high temperature in summer or failure of a locking/unlocking function of the smart vehicle key at low temperature in winter. For example, the portable device can adaptively adjust its transmit frequency, scanning frequency, transmit power, and the like when the ambient temperature is too high (for example, higher than 50° C.) or too low (for example, lower than 0° C.), to ensure normal operation of a battery, a locking/unlocking function, and the like.

It should be understood that, some of the block diagrams shown in the accompanying drawings of the disclosure are functional entities and do not necessarily correspond to physically or logically independent entities. These functional entities may be implemented in the form of software, in one or more hardware modules or integrated circuits, or in different networks and/or processor apparatuses and/or micro-controller apparatuses.

It should also be understood that, in some alternative embodiments, the functions/steps included in the foregoing methods may not occur in the order shown in the flowchart. For example, two functions/steps shown in sequence may be executed substantially simultaneously or even in a reverse order. This specifically depends on the functions/steps involved.

In addition, those skilled in the art readily understand that the method provided in the one or more embodiments of the disclosure can be implemented by using a computer program. For example, when a computer storage medium (for example, a USB flash drive) storing the computer program is connected to a computer, the method in one or more embodiments of the disclosure can be performed by running the computer program.

Although only some implementations of the disclosure are described above, a person of ordinary skill in the art should understand that the disclosure may be implemented in multiple other forms without departing from the essence and scope of the disclosure. Accordingly, the presented examples and implementations are considered to be illustrative rather than restrictive, and the disclosure may encompass various modifications and replacements without departing from the spirit and scope of the disclosure that are defined by the appended claims.

What is claimed is:

1. A portable device for unlocking a vehicle, comprising:
a communication unit configured to scan a pairing request signal from the vehicle, and transmit a locking/unlocking signal to the vehicle; and
a processing unit configured to:
receive a motion status signal indicating a motion status of the portable device and a temperature signal indicating an ambient temperature of the portable device; and
switch an operating mode of the portable device based on at least one of the motion status signal and the temperature signal, wherein the processing unit is further configured to switch the portable device to a protective operating mode when the ambient temperature is higher than a first temperature threshold or lower than a second temperature threshold and to perform at least one of the following operations when the ambient temperature is lower than the second temperature threshold:
reducing the scanning frequency of the portable device to a first frequency threshold;
reducing the transmit power of the portable device to a first power threshold; and
increasing the transmit frequency of the portable device to a second frequency threshold.

2. The device according to claim 1, wherein at least one of the following parameters of the portable device changes when the operating mode is switched: a scanning frequency, a transmit power, a transmit frequency, and an on-off status of each sensor.

3. The device according to claim 1, wherein the portable device further comprises at least one of the following:

a motion sensor configured to detect the motion status of the portable device; and a temperature sensor configured to detect the ambient temperature of the portable device.

4. The device according to claim 1, wherein the processing unit is further configured to perform at least one of the following operations when the ambient temperature is higher than the first temperature threshold:

reducing the scanning frequency of the portable device to a first frequency threshold; and reducing the transmit power of the portable device to a first power threshold.

5. The device according to claim 1, wherein the processing unit is further configured to: when the ambient temperature is lower than a third temperature threshold, generate a first command for generating alarm prompt information, wherein the third temperature threshold is lower than or equal to the second temperature threshold.

6. The device according to claim 1, wherein the processing unit is further configured to switch the portable device to a deep sleep mode when the motion status signal indicates that the portable device has been in a stationary state for a first time threshold.

7. The device according to claim 6, wherein in the deep sleep mode, the processing unit is further configured to:

reduce the scanning frequency of the portable device to a third frequency threshold; and generate a second command for disabling an ambient temperature detection function.

8. A control method for a portable device, the portable device being configured to unlock a vehicle, and the method comprising the following steps:

A. receiving a motion status signal indicating a motion status of the portable device and a temperature signal indicating an ambient temperature of the portable device; and B. switching an operating mode of the portable device based on at least one of the motion status signal and the temperature signal, wherein step B comprises:

B1. switching the portable device to a protective operating mode when the ambient temperature is higher than a first temperature threshold or lower than a second temperature threshold, and wherein in step B1, at least one of the following operations is performed when the ambient temperature is lower than the second temperature threshold:

reducing the scanning frequency of the portable device to a first frequency threshold;

reducing the transmit power of the portable device to a first power threshold; and increasing the transmit frequency of the portable device to a second frequency threshold.

9. The method according to claim 8, wherein at least one of the following parameters of the portable device changes when the operating mode is switched: a scanning frequency, a transmit power, a transmit frequency, and an on-off status of each sensor.

10. The method according to claim 8, wherein in step B1, at least one of the following operations is performed when the ambient temperature is higher than the first temperature threshold:

reducing the scanning frequency of the portable device to a first frequency threshold; and reducing the transmit power of the portable device to a first power threshold.

11. The method according to claim 8, wherein step B1 further comprises:

when the ambient temperature is lower than a third temperature threshold, generating a first command for generating alarm prompt information, wherein the third temperature threshold is lower than or equal to the second temperature threshold.

12. The method according to claim 8, wherein step B further comprises:

B2. switching the portable device to a deep sleep mode when the motion status signal indicates that the portable device has been in a stationary state for a first time threshold.

13. The method according to claim 12, in step B2, in the deep sleep mode:

the scanning frequency of the portable device is reduced to a third frequency threshold; and a second command is generated for disabling an ambient temperature detection function.

14. A non-transitory computer-readable storage medium storing a computer program thereon, wherein the program implements, when executed by a processor, a method of any one of claim 8.

* * * * *